United States Patent
Sakai

(10) Patent No.: US 6,269,714 B1
(45) Date of Patent: Aug. 7, 2001

(54) CUTTER KNIFE FOR THERMOPLASTIC RESIN PELLETIZER AND PRODUCTION METHOD OF SAID CUTTER KNIFE

(75) Inventor: Tadashi Sakai, Musashino (JP)

(73) Assignee: Kakoh Kiki Co., Ltd. (JP)

( * ) Notice: Subject to any disclaimer, the term of this patent is extended or adjusted under 35 U.S.C. 154(b) by 0 days.

(21) Appl. No.: 09/290,634

(22) Filed: Apr. 12, 1999

Related U.S. Application Data

(63) Continuation-in-part of application No. 08/866,734, filed on May 30, 1997, now abandoned.

(30) Foreign Application Priority Data

May 30, 1996 (JP) .................................................. 8-159058

(51) Int. Cl.$^7$ .................................................. B21K 21/00
(52) U.S. Cl. .................. 76/101.1; 228/124.1; 228/122.1; 83/651
(58) Field of Search ............................. 83/651, 663, 673, 83/675, 698.41, 913; 76/101.1, 115, 113, 107.8; 228/122.1, 124.1

(56) References Cited

U.S. PATENT DOCUMENTS

| | | | |
|---|---|---|---|
| 1,434,047 | * 10/1922 | De Bats | 428/663 |
| 4,090,674 | * 5/1978 | Marshall et al. | 83/698 X |
| 4,602,731 | * 7/1986 | Dockus | 228/122.1 X |
| 4,624,404 | * 11/1986 | Ohmae et al. | 228/122.1 X |
| 4,723,862 | * 2/1988 | Ito et al. | 403/272 |
| 4,735,866 | * 4/1988 | Moorhead | 228/172 X |
| 4,759,248 | * 7/1988 | Mueller et al. | 83/698 X |
| 5,082,161 | * 1/1992 | Utida et al. | 228/122.1 |
| 5,108,025 | * 4/1992 | Kang et al. | 228/122.1 |
| 5,234,152 | * 8/1993 | Glaeser | 228/122.1 X |
| 5,722,306 | * 3/1998 | Vela et al. | 228/160 X |

* cited by examiner

Primary Examiner—M. Rachuba
(74) Attorney, Agent, or Firm—Oldham & Oldham Co., L.P.A.

(57) ABSTRACT

To provide a way to use a ceramic alloy as a material for producing a cutter knife to be mounted on a thermoplastic resin pelletizer easily, with reduced costs, and also eliminating the possibility of breakage.

8 Claims, 6 Drawing Sheets

CUTTER KNIFE FOR THERMOPLASTIC RESIN PELLETIZER AND PRODUCTION METHOD OF SAID CUTTER KNIFE

CROSS-REFERENCE TO RELATED APPLICATIONS

This application is a continuation-in-part of U.S. patent application Ser. No. 08/866,734 filed May 30, 1997 now anandoned.

FIELD OF THE INVENTION

This invention relates to a cutter knife to be mounted on a thermoplastic resin pelletizer for pelletizing thermoplastic resin. The invention also relates to a production method of said cutter knife.

BACKGROUND OF THE INVENTION

For the sake of convenience of transportation, reducing costs of later processing and other reasons, thermoplastic resin is normally produced and distributed in the form of pellets, which are small, approximately rice-grain sized particles. These pellets are produced industrially by means of a kneading pelletizing (extrusion) machine incorporated in a chemical apparatus. Examples of types of a pelletizing device used in such a pelletizer include a hot cut type and a underwater cut type. There are also various blades used for this purpose; a typical example of fixed blades is a die plate, while there is a cutter knife 1 shown in FIG. 8 as an example of movable blades. Nowadays, because of their superior abrasion resistance and resin cutting capability, ceramic alloys are most widely used as a material of cutter knife 1.

However, ceramic alloys used as a material of such a cutter knife present various problems; not only are they expensive and hard to acquire but also prone to being chipped or broken because they have lower resistance to a transverse load, in other words are more fragile, compared with steel which is the most typical blade material. Although ceramic alloys require a thorough countermeasure to solve the above problems, it cannot be said that a sufficiently effective countermeasure exists at present. Furthermore, a ceramic alloy is difficult to process by using machine, which means that processing a ceramic alloy is costly. Therefore, using a ceramic alloy, which is itself an expensive material, to produce cutter knives substantially increases their costs.

A prior art method of producing a ceramic alloy cutter knife uses a process of sintering powdered ceramic alloy directly to two large base metal bodies by using a special container and then subjecting the contents to a hot isostatic pressing (HIP) process. The bodies are removed from the container and separated from each other. Each body is then cut along its longitudinal axis which is directly in the middle of the ceramic alloy material. Each half is then cut again into individual pieces or blanks, which are in turn cut again and formed into individual cutter knives. In addition, the process requires that the ceramic alloy be ground into a knife edge. The powdered ceramic alloy HIP process is complicated and presents various technological difficulties, for example, the air must be removed from the container prior to sintering which naturally results in the discharge of some of the powdered material. The entire production method is expensive and does not alleviate any problems associated with fragility of the ceramic alloy blade or that of avoiding unnecessary processing. In addition, powdered ceramic alloy material is less available and must be specially procured from a powder manufacturer. In short, the prior art method does not address the problems associated with producing a ceramic alloy cutter knife in terms of expense, the delicate nature of the material, availability of ceramic alloy material and the reduction of processing of the blade.

SUMMARY OF INVENTION

In order to solve the above problems presented by conventional cutter knives, an object of the invention is to provide a cutter knife for a thermoplastic resin pelletizer and its production method by using a ceramic alloy as a material for said cutter knife, wherein said cutter knife can easily be produced with reduced costs and without danger of breakage in spite of using a ceramic alloy as a material. A feature of the invention is a cutter knife to be mounted on a thermoplastic resin pelletizer for pelletizing thermoplastic resin, wherein the main body and the knife edge of the cutter knife are integrally formed, the main body formed out of steel and the knife edge formed out of ceramic alloy. According to the second feature of the invention, a groove is formed in a corner of a rectangular steel body in such a manner as to extend in the longitudinal direction of the steel body which has an appropriate thickness, a ceramic alloy plate is inserted into the groove and bonded thereto by means of diffusion bonding, and the material is then cut into a specified shape. According to the third feature of the invention, a steel block is shaped as to have a step when viewed from the side and, after having a ceramic alloy plate bonded to the upper surface of the lower step thereof by means of diffusion bonding, is diagonally cut at specified intervals, and then, each cut piece is cut into a specified shape. A fourth feature of the invention is the use of a functionally gradient material between the bonding surfaces of the ceramic alloy plate and the steel body prior to the diffusion bonding which acts as a binder during the diffusion bonding process to improve the strength, defacement resistance and chipping resistance of the cutter knife and in particular, the ceramic alloy blade.

DESCRIPTION OF PREFERRED EMBODIMENTS

Figure 1:
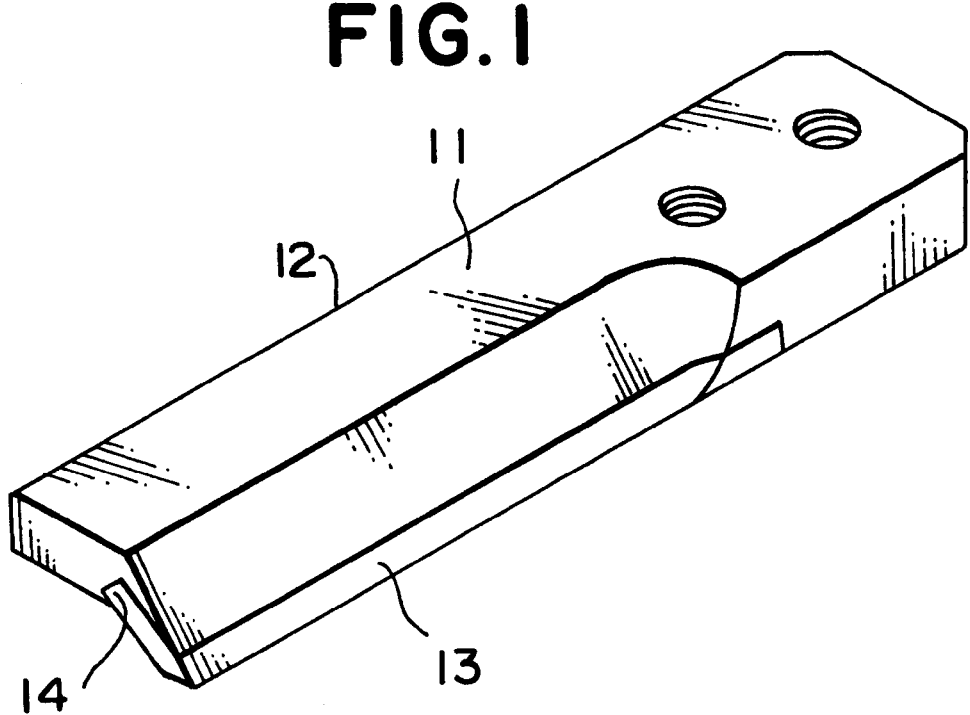
FIG. 1 is a perspective view of a cutter knife according to the invention.

Embodiments of the present invention are explained in detail hereunder referring to the drawings.

Numeral 11 denotes a cutter knife used as a movable blade of a thermoplastic resin pelletizer 20. Cutter knife 11 comprises a main body 12 made of steel and a knife edge 13 which is formed out of a ceramic alloy as an integral body with main body 12.

Although the ceramic alloy used for the present embodiment is a titanium carbide (TiC)—type alloy, it is to be understood that ceramic alloys applicable for the present invention are not limited to a TiC alloy.

Figure 2:
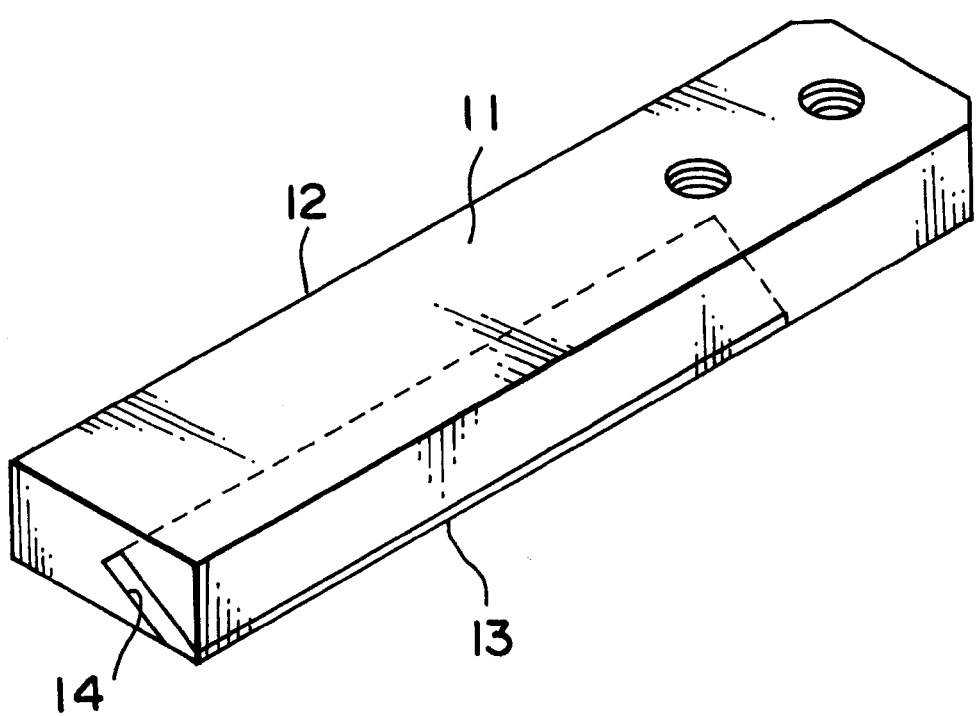
FIG. 2 is a perspective view of cutter knife of FIG. 1 before the cutting processing.

A groove 14 is formed in a corner of main body 12 in such a manner as to extend in the longitudinal direction of main body 12 and intruding or extending towards the middle of main body 12, which is formed out of steel into a rectangular shape having an appropriate thickness, and a ceramic alloy plate that constitutes knife edge 13 is inserted into groove 14 and bonded thereto by means of diffusion bonding (see FIG. 2). Then, by cutting the material into a specified shape by a method known to those skilled in the art, cutter knife 11 is formed (see FIG. 1). The ceramic alloy plates 13 are easily produced from larger blocks of sintered ceramic alloy material. This allows the plates to be easily and relatively inexpensively produced into thin sheet plates 13. The ceramic alloy plates 13 produced in this manner are preferably, but not limited to, about 2 mm thick. The ceramic alloy plates 13 produced in this manner have a considerably high yield which significantly reduces material and production costs. An advantage of this embodiment of the invention is that the groove 14 provides increased support for the ceramic alloy plate and knife edge 13. The groove 14 also provides protection by surrounding a majority of the fragile ceramic alloy plate 13 during handling, processing as well as use of the cutter knife 11.

Figure 3:
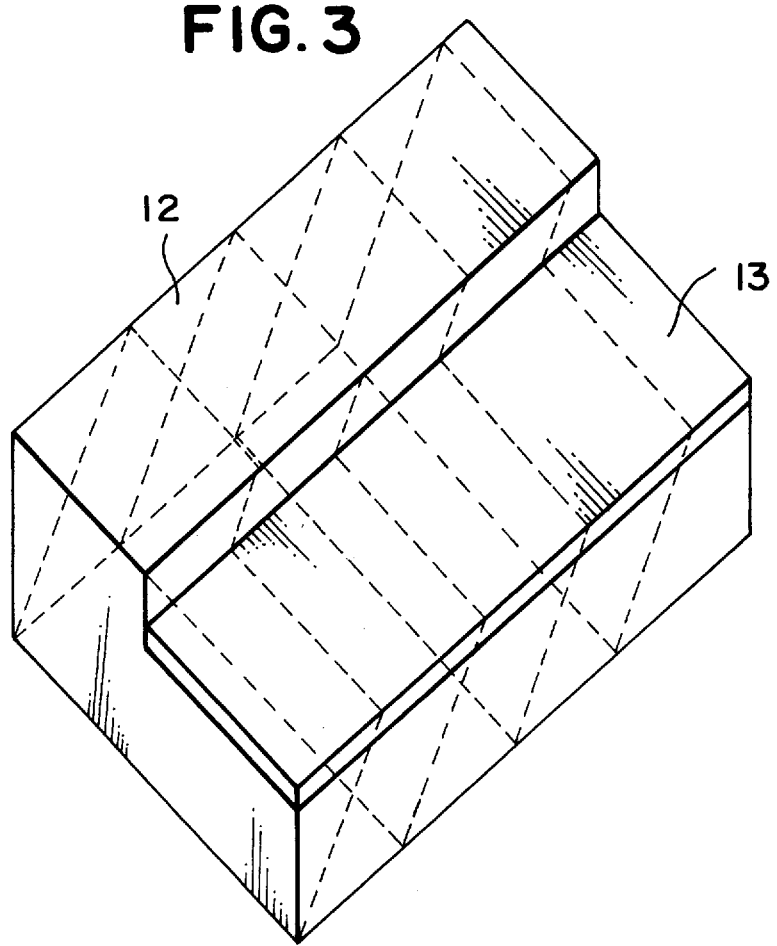
FIG. 3 is a perspective view to explain another method of processing a cutter knife according to the invention, illustrating the state where ceramic alloy plate is bonded by means of diffusion bonding.
Figure 4:
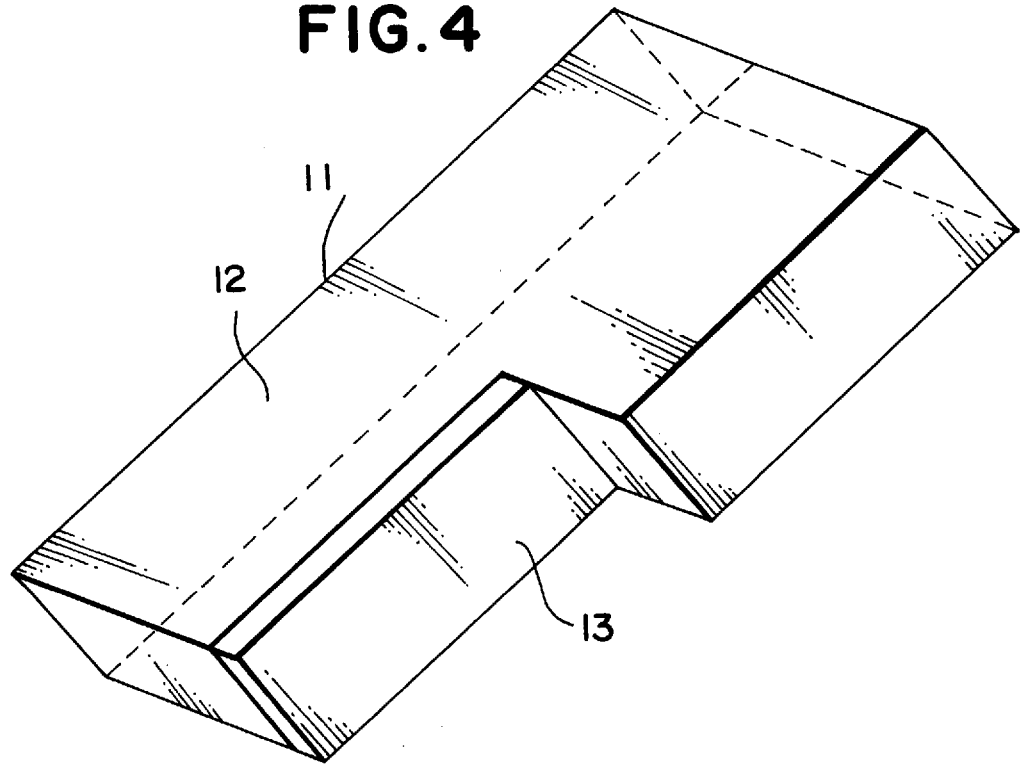
FIG. 4 is a perspective view of the embodiment of FIG. 3 illustrating a cut piece.
Figure 5:
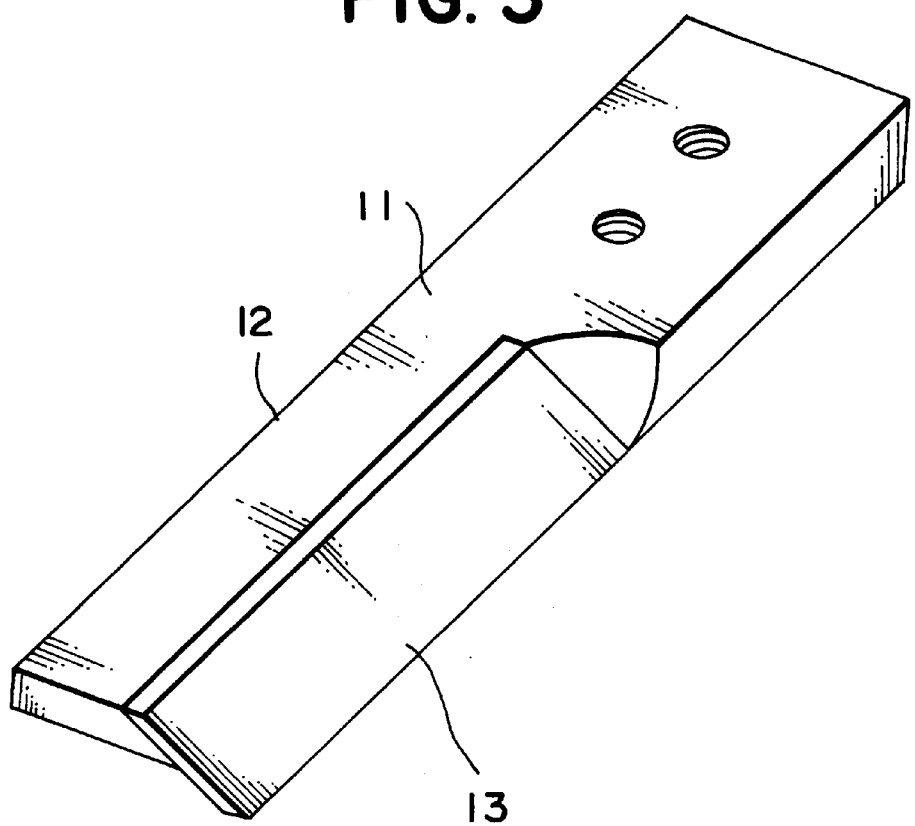
FIG. 5 is a perspective view of the embodiment of FIG. 3 after the cutting processing.
Figure 6:
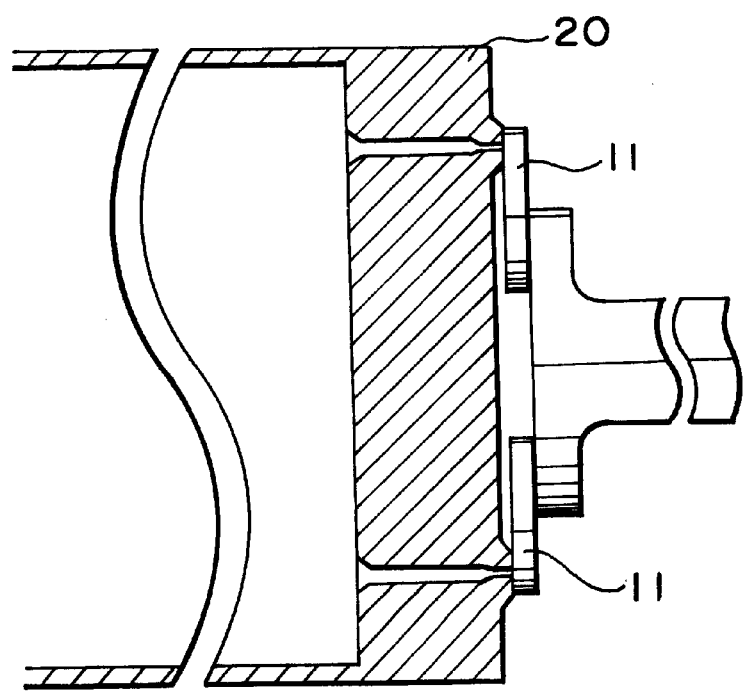
FIG. 6 is a schematic partial cross sectional view illustrating the relationship between a thermoplastic resin pelletizer and its cutter knives.
Figure 7:
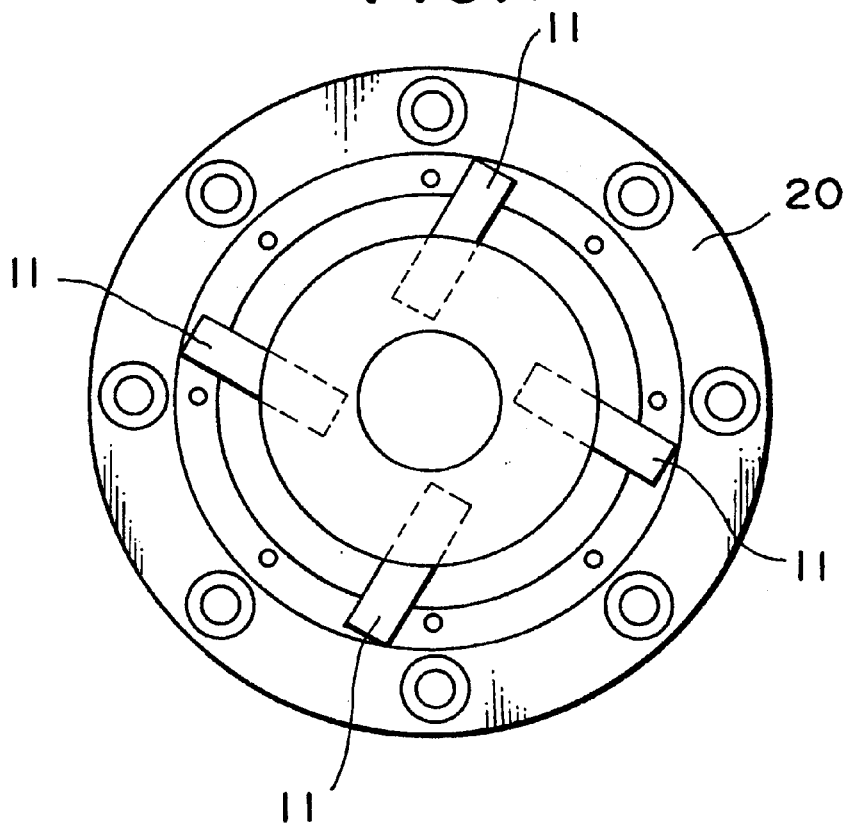
FIG. 7 is a front view of the arrangement shown in FIG. 6.
Figure 8:
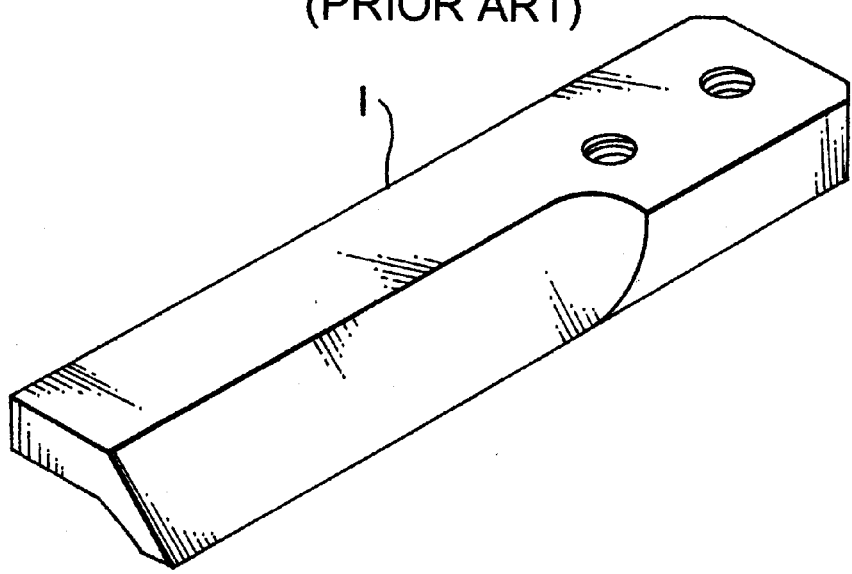
FIG. 8 is a perspective view of a conventional cutter knife.
Figure 9:
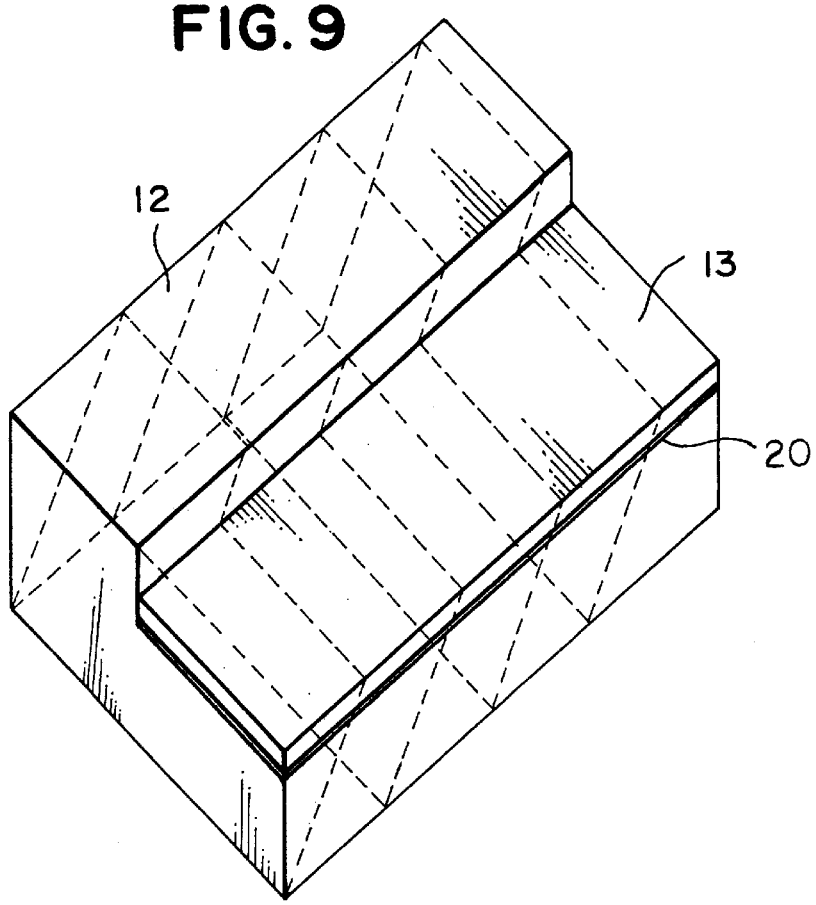
FIG. 9 is a perspective view of an alternate embodiment illustrating the state where ceramic alloy plate is bonded by means of diffusion bonding using a thin plate of functionally gradient material.
Figure 10:
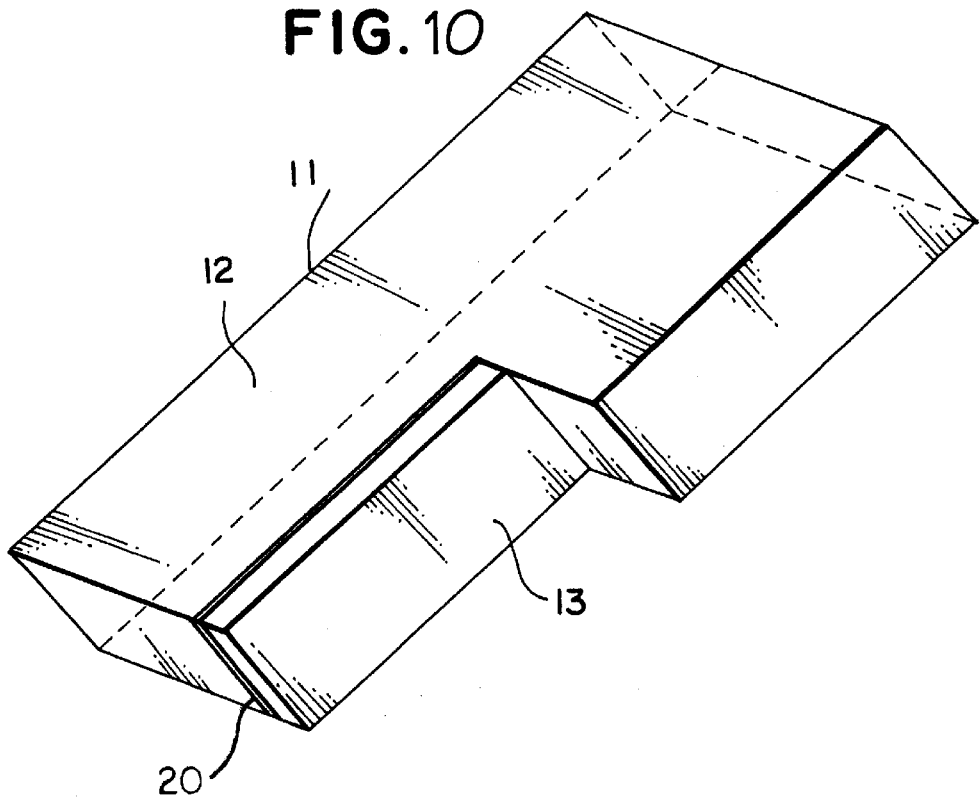
FIG. 10 is a perspective view of the embodiment of FIG. 9 illustrating a cut piece.

In another embodiment of the invention, a steel block serving as the material of main body 12 is so shaped as to have a step when viewed from the side, and then, after bonding a ceramic alloy plate that constitutes knife edge 13 to the upper surface of the lower step by means on diffusion bonding, is diagonally cut at specified intervals (see FIGS. 3 and 4). Then, by cutting the material into a specified shape by a method known to those skilled in the art, cutter knife 11 is formed, in the same manner as the previous embodiment (see FIG. 5). The diagonal cut results in a sharpened knife edge 13 that requires little or no post processing. This is important feature due to the problems (fragility, expensive, machining difficulty) associated with the ceramic alloy as described above.

In an alternate embodiment of the invention, the bonding of the ceramic alloy plate 13 to the main body 12 can be strengthened and improved by using a thin plate 20 of a functionally gradient material placed between the ceramic alloy plate 13 and the main body 12. Typical functionally gradient materials include, but are not limited to, nickel, silver and copper which all have relatively high melting temperatures. The diffusion bonding of the ceramic alloy plate 13 to the main body 12 is accomplished by hot isostatic pressing (HIP). This process uses high temperature and high pressure to create the diffusion bond. When the thin plate 20 of nickel, for example, is placed between the ceramic alloy plate 13 and the main body 12, the temperature in the HIP furnace is increased to just below the melting temperature of the nickel while at the same time subjecting the parts to high pressure. At this point, the nickel diffuses into the ceramic alloy plate 13 and the main body 12. The thin plate 20 acts as a binder to improve the uniform consistency and strength of the bond by promoting the diffusion of the ceramic alloy plate 13 into the main body 12 and the diffusion of the main body 12 into the ceramic alloy plate 13. The method of producing the cutter knife is altered to take advantage of the properties of the functionally gradient material and thereby improving the strength, defacement resistance and chipping resistance of the cutter knife 11 and in particular, the ceramic alloy blade 13. The thickness of the thin plate 20 of the functionally gradient material used in this process is typically, but not limited to, the range of about 0.1–0.3 mm and preferably 0.1 mm.

Figure 11:
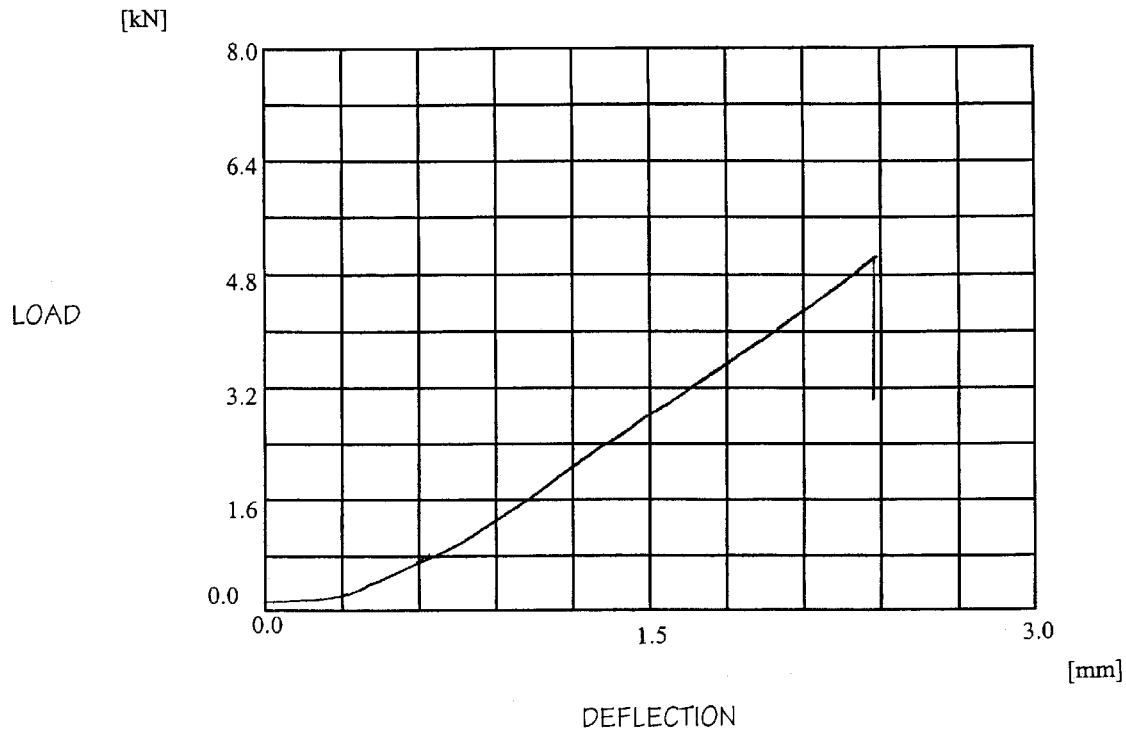
FIG. 11 is a graph of test data to show the strength characteristics of a ceramic alloy bar.
Figure 12:
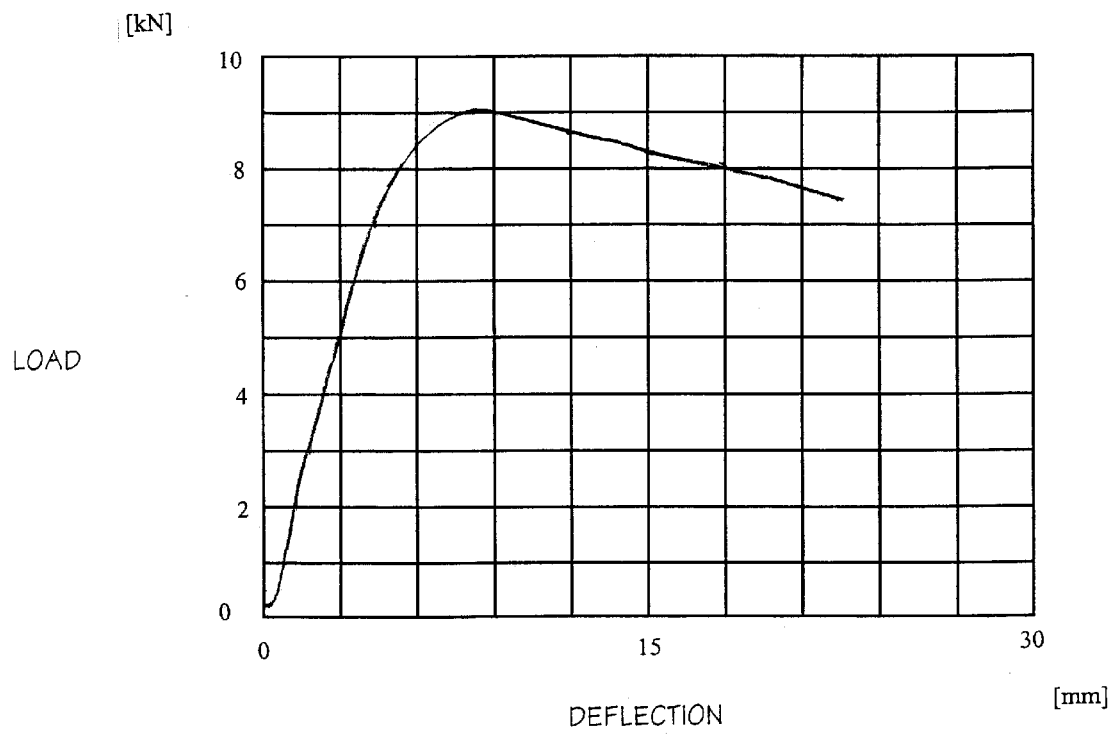
FIG. 12 is a graph of test data to show the strength characteristics of a diffusion bonded ceramic alloy/steel body bar.

Referring now to FIGS. 11 and 12, the advantage of using a thin ceramic alloy plate 11 in producing a cutter knife 11 is illustrated. In FIG. 11, a bar of ceramic alloy having a 12 mm thickness was subjected to a compression and bending test. Due to the brittleness of the ceramic alloy material, the bar failed (broke) at 5.01 kN after a transformation/displacement of less than 2.6 mm. In FIG. 12, a bar of ceramic alloy plate of 2 mm thickness diffusion bonded to a steel body 10 mm thick was subjected to the same compression and bending test. Due to improved strength and ductility of the diffusion bonded materials, the bar attained a maximum load of 9.01 kN after a transformation/displacement of about 9.0 mm and did not break after achieving transformation/displacement of over 22.0 mm.

Effect of Invention

As described above, the present invention substantially improves breakage resistance of a cutter knife to be mounted on a thermoplastic resin pelletizer for pelletizing thermoplastic resin by integrally forming the main body and the knife edge of the cutter knife out of steel and ceramic alloy respectively. Further, the invention is capable of reducing costs of material by forming the main body out of steel, as well as considerably reducing production costs of cutter knives by simplifying their production method.

What is claimed:

1. A method of producing a cutter knife for a thermoplastic resin pelletizer, said method including the steps of:

forming a main body into such a shape as to have a step in one side thereof;

securing a ceramic alloy plate to an upper surface of said main body;

diagonally cutting said main body and said ceramic alloy plate at specified intervals to form cut pieces; and cutting each of said cut pieces into a specified shape.

2. The method of claim 1, wherein said step of securing said ceramic alloy plate to said main body is performed by diffusion bonding.

3. The method of claim 1, wherein said step of securing a ceramic alloy plate to the upper surface of said step of said main body is preceded by inserting a plate of a functionally gradient material between said ceramic alloy plate and said main body.

4. The method of claim 3, wherein
said step of securing said ceramic alloy plate to said main body is performed by diffusion bonding wherein said functionally gradient material serves as a binder in said diffusion bonding process.

5. The method of claim 1, wherein said step of cutting each of said cut pieces into a specified shape does not require substantial post processing of said ceramic alloy plate.

6. The method of claim 1, wherein said step of diagonally cutting forms a sharpened knife edge on said ceramic alloy plate which does not require substantial post processing.

7. The method of claim 3, wherein said plate of functionally gradient material has a thickness in the range of 0.1–0.3 mm.

8. The method of claim 1, wherein said ceramic alloy plate has a thickness up to about 2 mm.

* * * * *